United States Patent
Myers et al.

(10) Patent No.: US 11,761,434 B2
(45) Date of Patent: Sep. 19, 2023

(54) OPTOMECHANICAL FIBER ACTUATOR

(71) Applicant: The Government of the United States of America, as represented by the Secretary of the Navy, Arlington, VA (US)

(72) Inventors: Jason D. Myers, Alexandria, VA (US); Jesse A. Frantz, Washington, DC (US); Jasbinder S. Sanghera, Ashburn, VA (US); Daniel Rhonehouse, Huntingtown, MD (US); Christopher Bardeen, Riverside, CA (US); Colin Baker, Alexandria, VA (US); Geoffrey Chin, Oakton, VA (US); Peter Alexander Morrison, Alexandria, VA (US)

(73) Assignee: The Government of the United States, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/689,843

(22) Filed: Mar. 8, 2022

(65) Prior Publication Data
US 2022/0290660 A1    Sep. 15, 2022

Related U.S. Application Data

(60) Provisional application No. 63/158,641, filed on Mar. 9, 2021.

(51) Int. Cl.
*F03G 7/06*    (2006.01)
*G02B 6/02*    (2006.01)

(52) U.S. Cl.
CPC ....... *F03G 7/0614* (2021.08); *G02B 6/02342* (2013.01)

(58) Field of Classification Search
CPC .. F03G 7/0614; F03G 7/06113; F03G 7/0616; F03G 7/062; G02B 6/02342; G02B 6/02052; G02B 6/036
See application file for complete search history.

(56) References Cited

U.S. PATENT DOCUMENTS 5,671,314 A * 9/1997 Gregory ............... A61N 5/0601
385/127

OTHER PUBLICATIONS

White et al., "A high frequency photodriven polymer oscillator," Soft Matter, 2008, vol. 4, pp. 1796-1798, 3 pages.
Ryu et al., "Photo-origami-Bending and folding polymers with light," Applied Physics Letters, 2012, vol. 100,161908, 6 pages.
Ware et al., "Voxelated liquid crystal elastomers," Science, 2015, vol. 347, Issue 6225, pp. 982-984, 4 pages.
(Continued)

*Primary Examiner* — Donald L Raleigh
(74) *Attorney, Agent, or Firm* — US Naval Research Laboratory; Hong-Vinh Nguyen

(57) ABSTRACT

Systems and methods are provided for a mechanical actuator based on a fiber optic platform. A material that is configured to be activated by light may be incorporated into an optical fiber that serves as both an actuator and a power delivery network. This platform is adaptable to different materials, types of motions, and length scales and allows for precise delivery of photons to the material.

20 Claims, 3 Drawing Sheets

(56) References Cited

OTHER PUBLICATIONS

Bian et al., "Optically activated cantilever using photomechanical effects in dye-doped polymer fibers," Journal of Dptical Society of America B, 2006, vol. 23, Issue 4, pp. 697-708, 12 pages.

Dong et al., "Effects of Template and Molecular Nanostructure on the Performance of Organic-Inorganic Photomechanical Actuator Membranes," Advanced Functional Materials, 2020, vol. 30, 1902396, 9 pages.

* cited by examiner

OPTOMECHANICAL FIBER ACTUATOR

CROSS-REFERENCE TO RELATED APPLICATIONS

This application is a non-provisional of and claims the benefit of U.S. provisional application No. 63/158,641 filed on Mar. 9, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case No. 210168-US2.

BACKGROUND

Conventional mechanical actuators are based on electrical motors. While they are certainly a mature and ubiquitous technology, they have limitations: motors are relatively heavy, bulky, require power delivery through metallic cables, and are not suitable to performing complex, bio-inspired motions. Thus, a different actuation mechanism would have advantages. One such candidate mechanical actuator is based on optomechanical materials that directly convert photons into mechanical work.

Optomechanical materials respond to illumination with a change in physical dimension, either by a phase change or by a molecular conformation change. There is interest in exploring the photochemistry, macroscopic alignment, crystallinity, etc., of a variety of materials, typically through incorporation of these materials into liquid crystal elastomers or on bulk materials or crystals. For example, it has been shown that by incorporating optomechanical materials into a matrix of porous aluminum oxide, strain may be generated. However, this configuration yields a very small activated volume due to strong absorption of actinic light, yielding a limited total response. In addition, large-scale, external flood illumination of a sample may be required. In an actual platform, such illumination is impractical because it will require electrical power delivery to a light source that is adjacent to the optomechanical actuator. This is undesirable from both a platform integration and an efficiency standpoint.

SUMMARY

Systems and methods are provided for a mechanical actuator based on a fiber optic platform. A material that is configured to be activated by light may be incorporated into an optical fiber that serves as both an actuator and a power delivery network. This platform is adaptable to different materials, types of motions, and length scales and allows for precise delivery of photons to the material.

An actuator is described herein. The actuator includes a first region configured to guide light from an optical source; a second region configured to scatter the guided light from the first region to a third region, the second region being proximate to the first region; and the third region comprising a first material configured to absorb the scattered light to create a mechanical response.

A system is also described herein. The system includes a plurality of optical fibers. Each optical fiber comprises a first region configured to guide light from an optical source; a second region configured to scatter the guided light from the first region to a third region, the second region being proximate to the first region; and the third region comprising a first material configured to absorb the scattered light to create a mechanical response.

A method for fabricating an actuator is also described. The method includes forming a first region that is configured to guide light from an optical source; forming a second region that is configured to scatter the guided light from the first region to a third region, the second region being proximate to the first region; forming the third region that comprises a first material configured to absorb the scattered light to create a mechanical response.

Further features and advantages of the invention, as well as the structure and operation of various embodiments are described in detail below with reference to the accompanying drawings.

DETAILED DESCRIPTION

Definitions

Figure 1:
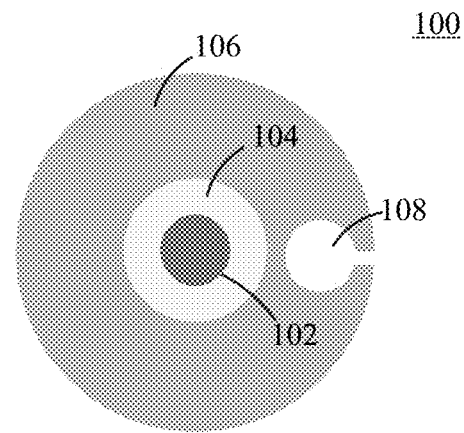
FIG. 1 depicts a cross sectional view of a fiber, according to an example embodiment.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Optomechanical materials respond to illumination with a change in physical dimension, either by a phase change (amorphous to crystalline, solid to liquid, etc.) or by a molecular conformation change (i.e., a cis- to trans-isomerization). The activating light may either be a specific wavelength (e.g., 532 nanometer) or a broad spectrum of light depending on the specific properties of the optomechanical material. With proper system design, the shape change may be exploited into mechanical motion. For example, azobenzene molecules that undergo a cis- to trans-isomerization may be incorporated into a liquid crystal elastomer matrix. By controlling the molecular alignment (director profile) of the liquid crystal assembly, large-scale mechanical response may be achieved when the structure is illuminated due to reorganization and shape change of azobenzene molecules.

Described herein are photon-driven mechanical actuators based on fiber optics. Embodiments described herein utilize a structured optical fiber to isolate the optical mode from the strongly absorbing photomechanical material, thereby providing a scattering matrix to direct light. This provides better control of location and amount of desired movement than what is achievable with current technology. Other advantages of these mechanical actuators include an interaction length that is greatly extended, an increase in total activated volume, and simple implementation as it is easy to incorporate the optical fiber into fiber optical distribution networks.

The mechanical actuators may be configured in numerous ways and may have the following common features: (1) a first region that has a high index of refraction to guide light, (2) a second region proximate to the first region that interacts with that light and causes scattering, and (3) an optomechanical material integrated into the fiber geometry that absorbs the scattered light to create a mechanical response.

FIG. 1 depicts a cross sectional view of a fiber, according to an example embodiment. Fiber 100 shown in FIG. 1 may include a first region 102, a second region 104, and a pore 108 configured to accommodate a third region that includes a material configured to absorb the scattered light to create a mechanical response. Fiber 100 may further include a cladding 106.

First region 102 is configured to guide light from an optical source. In an embodiment, first region 102 may include a single mode core or a multimode core. Second region 104 is configured to scatter the guided light from first region 102 to the optomechanical material. In an embodiment, fiber 100 may be fabricated with first region 102 and second region 104, and pore 108 may be drilled or otherwise formed in fiber 100. Post fabrication, pore 108 may be infilled with an optomechanical material such as azobenzene (or derivatives) or diarylethene that undergoes a molecular transformation (e.g., cis- to trans-isomerization) upon illumination, thereby causing volumetric expansion due to molecular reorganization or structural phase changes. Alternatively, thin film inorganic materials such as Ge—Sb—Te compounds (e.g., $Ge_2Sb_2Te_2$), phase change materials (e.g., melting waxes) that absorb or release energy at phase transitions, or other organic and inorganic compounds may be used rather than the optomechanical material. In FIG. 1, pore 108 is shown as being circular with an open channel. However, pore 108 may be formed with any geometry, with or without the open channel. Any suitable process or geometry appropriate for the selected material and/or application may be used to incorporate one or more of these materials into fiber 100. In an embodiment, multiple pores may be formed to accommodate one or more types of optomechanical material, inorganic material or phase change material.

Unlike other fibers that typically include non-scattering claddings around the cores, second region 104 of fiber 100 is designed to scatter light to a desired extent such that light may be controllably directed to the optomechanical material. Thus, second region 104 may be formed with a different material than first region 102, with a refractive index difference between the two. Alternatively, second region 104 may be the same material as first region 102, albeit with a different effective index of refraction, for example, as provided by different process parameter(s) or mechanism(s) (e.g., introduction of bubbles), etc. Thus, in an embodiment, second region 104 is designed to couple light to the optomechanical material via an overlap of the optical mode and the optomechanical material, such that light maybe absorbed by the optomechanical material to the desired extent. The desired mode overlap may also be created by controlling the geometries (and therefore mode distribution) of the first region 102, second region 104, and optomechanical material.

In an embodiment, fiber 100 may be fabricated from a preform that includes a core (region 102 shown in FIG. 1), a porous silica inner cladding (region 104 shown in FIG. 1) with a total outer dimension of approximately 250 μm. The core may have a higher effective refractive index in comparison to the porous silica inner cladding. Other suitable materials, such as a polymer, another silicate glass, a non-oxide glass (e.g., fluoride or chalcogenide) or specialty oxide glass (e.g., tellurite, germanate, or phosphate) may also be used in place of silica. In this embodiment, the outer cladding (region 106 shown in FIG. 1) may be formed from silica and may contain a pore-and-slot configuration (pore 108 shown in FIG. 1) that is infilled with an optomechanical material, through soaking in a solvent solution or melt. In this embodiment, the dimensions of the pore and slot may be 10-50 μm. For example, the dimension of the pore may be determined based on the penetration depth of the optomechanical material (e.g., two times the penetration depth for a circular pore) to enable the maximum activated volume. Fiber 100 may be more efficient when the activated volume of the optomechanical material is larger.

In an embodiment, fiber 100 may include a plurality of longitudinal sections, wherein each section is configured to be different to allow for longitudinal variation in fiber properties. For example, the different sections may be spliced together. As another example, the fiber 100 may be formed with different processing conditions to change the scattering properties of second region 104, resulting in different longitudinal sections with varying fiber properties. For example, during fiber draw, draw parameters may be varied to achieve longitudinal variation in fiber 100. This variation may be used, for instance, to linearize the scatter for a high-loss fiber.

In operation, light with an appropriate wavelength for activating the optomechanical materials (e.g., 375 nm, 532 nm, etc.) may be coupled into the core. When the light propagating within the core interacts with the porous silica inner cladding, it scatters and is absorbed by the optomechanical material, causing a molecular conformation change and introducing stress that causes fiber 100 to deflect. In some cases, fiber 100 may be jacketed after infill with a polymer cladding to provide protection and help contain the optomechanical material. In another embodiment, the pore-and-slot may be altered to promote a larger mechanical response or easier infill of the optomechanical material. In yet another embodiment, the infill material may be introduced after the polymer jacket is in place by any suitable means (e.g., pressure and/or vacuum).

Figure 2:
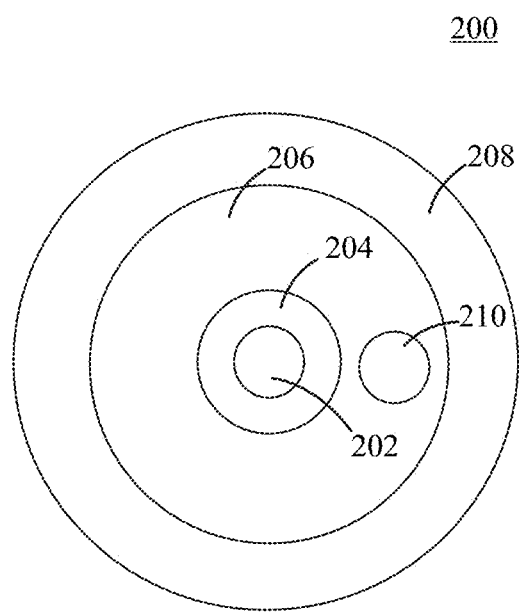
FIG. 2 depicts a cross sectional view of a fiber that is infilled and jacketed, according to an example embodiment.

FIG. 2 depicts a cross sectional view of a fiber that is infilled and jacketed, according to an example embodiment. Fiber 200 shown in FIG. 2 is similar to fiber 100 shown in FIG. 1, but with the addition of an outer jacket and infilled pore. Fiber 200 includes core 202, a scattering inner cladding 204, a clear outer cladding 206, an outer jacket 208, and an optomechanical material 210. In an embodiment, scattering inner cladding 204 may be fully formed around core 202, as shown in FIG. 2. In another embodiment, scattering inner cladding 204 may be partially formed around core 202 (e.g., a hemisphere or a rod formed between core 202 and optomechanical material 210).

Figure 3:
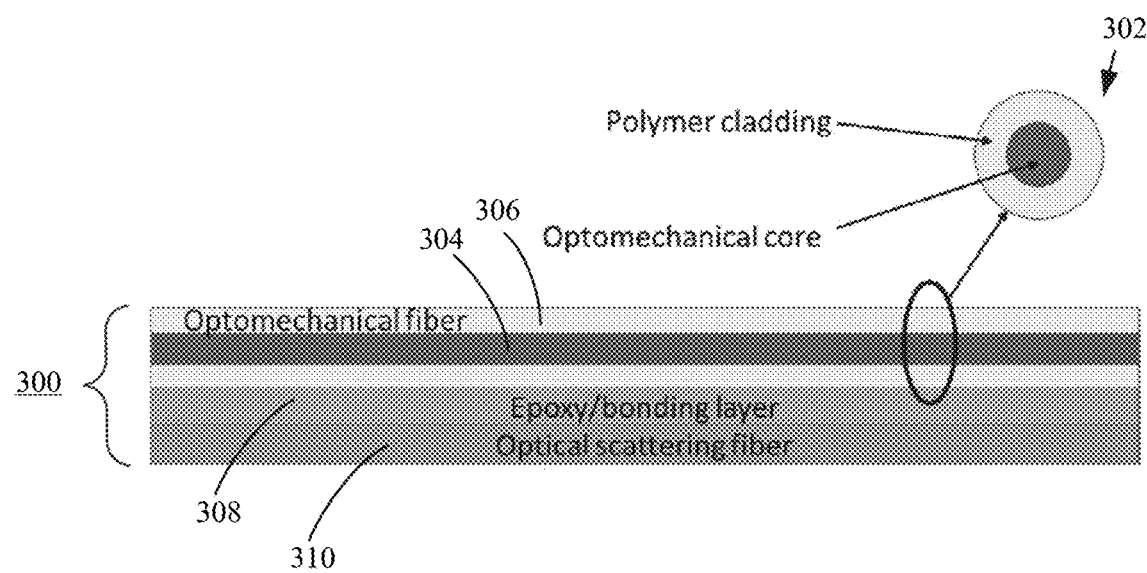
FIG. 3 depicts a cross sectional view of a bonded fiber assembly, according to an example embodiment.

FIG. 3 depicts cross sectional views of a bonded fiber assembly, according to an example embodiment. In FIG. 3, bonded fiber assembly 300 is shown as a cross sectional view, along its length. As shown in FIG. 3, bonded fiber assembly 300 includes an optomechanical fiber 302 coupled with optical scattering fiber 310. In an embodiment, optomechanical fiber 302 may include an optomechanical core 304 comprising an optomechanical material or similar and a polymer cladding 306. In this embodiment, optomechanical fiber 302 may be coupled with optical scattering fiber 310 via an epoxy or a bonding layer. In another embodiment, optomechanical fiber 302 may be coupled with optical scattering fiber 310 by a jacket that surrounds the two. In embodiments, one or more optomechanical fibers and/or one or more optical scattering fibers may be coupled together in any suitable manner and/or form. For example, they may be bundled together, coiled, or integrated/woven into flat, curved, or complex sheets.

Figure 4:
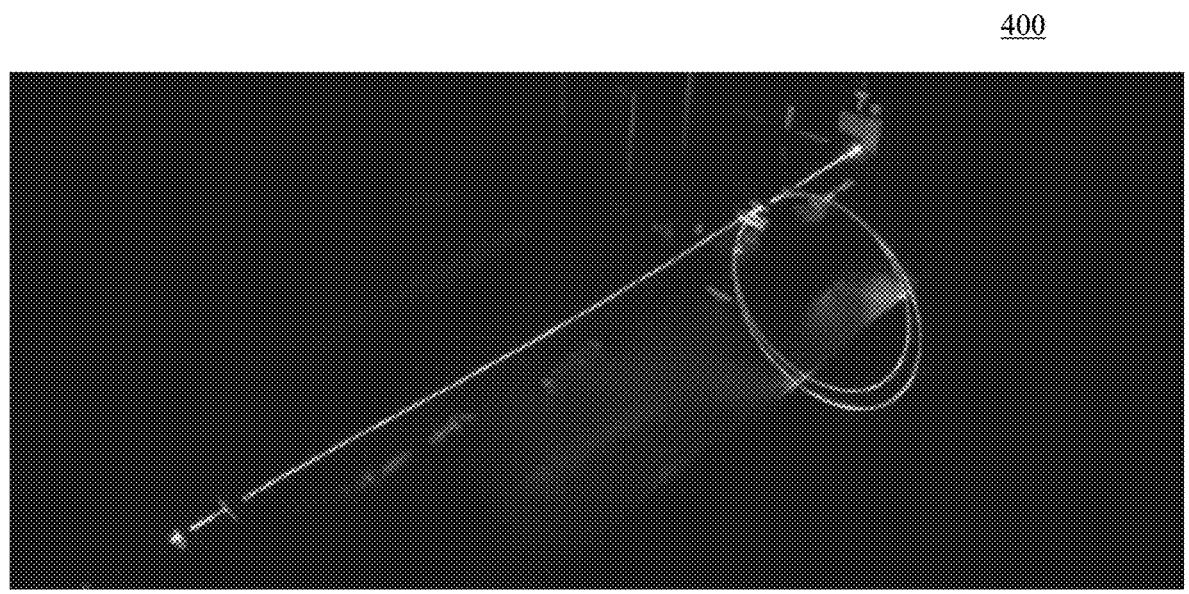
FIG. 4 depicts the fiber assembly of FIG. 3 being illuminated with light throughout its length.

FIG. 4 depicts the fiber assembly of FIG. 3 being illuminated with light throughout its length. In FIG. 4, the fiber assembly shown is approximately two meters in length. FIG. 4 depicts light (in light gray) being guided down the length of the fiber assembly, and the infilled optomechanical material is being exposed to that light throughout the length of the fiber assembly. Thus, in this configuration, the optomechanical material has an activated volume that is much greater than in a configuration in which the optomechanical material is uniformly deposited in a matrix with external light illuminating a surface of the matrix and penetrating only the first few micrometers.

Figure 5:
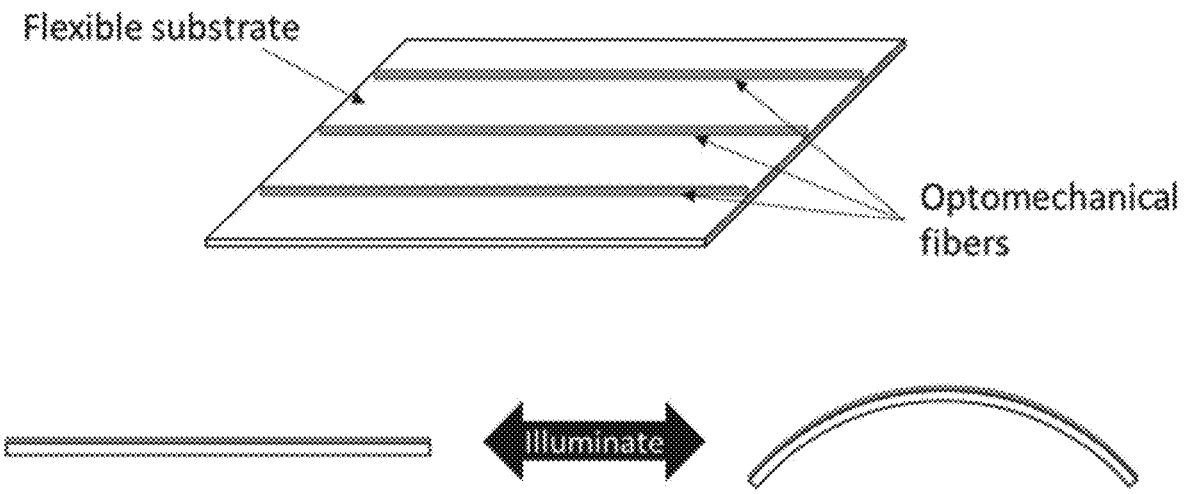
FIG. 5 depicts an optomechanical assembly, according to an example embodiment.

FIG. 5 depicts an optomechanical assembly, according to an example embodiment. As shown in FIG. 5, the optomechanical assembly includes a plurality of optomechanical fibers (e.g., fiber 100 or 200 shown in FIGS. 1 and 2, respectively) that are incorporated into a flexible substrate. Upon illumination of the optomechanical fibers, the substrate may bend or exhibit some sort of mechanical response. In an embodiment, the optomechanical fibers may be configured to be uniformly illuminated, for example, with a single optical source. In another embodiment, the optomechanical fibers may be configured to be non-uniformly or independently illuminated, for example, with multiple optical sources.

Figure 6:
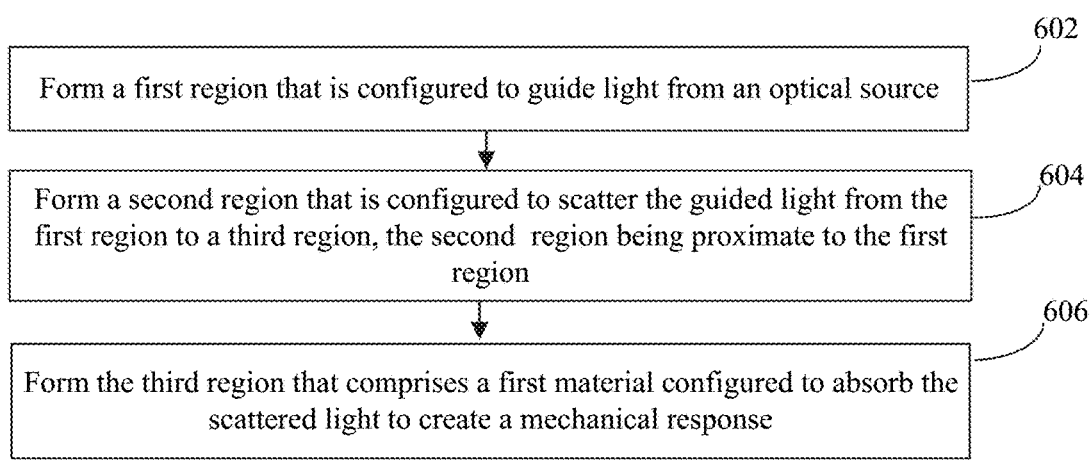
FIG. 6 depicts a flowchart for a method for fabricating an actuator, according to an example embodiment.

FIG. 6 depicts a flowchart for a method for fabricating an actuator, according to an example embodiment. In one embodiment, the actuator may include a waveguide or an optical fiber. Flowchart 600 depicted in FIG. 6 may include more or fewer steps and may be performed simultaneously and/or in a different order than shown. Flowchart 600 begins with step 602, in which a first region that is configured to guide light from an optical source is formed. In step 604, a second region that is configured to scatter the guided light from the first region to a third region is formed. In an embodiment, the second region may be proximate to the first region. In step 606, the third region may be formed. The third region may include a first material configured to absorb the scattered light to create a mechanical response. The first material may include one or more of an optomechanical material, an inorganic material, or a phase change material. In an embodiment, the material(s) for the actuator maybe selected based on the application and the different regions may be determined (e.g., using appropriate ratios) such that the regions are appropriately formed with the correct geometries and/or optical or material properties once the fiber is drawn. For example, a suitable combination of optomechanical material(s), optical source, and fiber optic materials may be selected based on desired properties, and the geometries and/or arrangement of the first, second and third regions may be determined based on the optical properties and desired mechanical response of the system.

In an example embodiment of an optical fiber, the third region may be formed by fabricating the optical fiber (including a core and scattering cladding). A pore may be formed post fabrication and infilled with an optomechanical or similar material.

In another example embodiment of an optical fiber, the third region may be formed by incorporating the first material into another fiber and coupling that fiber to the optical scattering fiber such that they are in intimate contact. For example, a fiber preform may be made of an optomechanical material core and a polymer cladding with a similar melting or softening temperature to the optomechanical material. For instance, an optomechanical component of 1,2-Bis(2,4-dimethyl-5-phenyl-3-thienyl)-3,3,4,4,5,5-hexafluoro-1-cyclopentene and poly (methylmetharcylate) may be used. This preform may be heated and pulled into a fiber that is bonded to a separate optical fiber that is designed to scatter light (such as optical scattering fiber 310, shown in FIG. 3).

In yet another example embodiment of an optical fiber, the optical fiber may be fabricated by incorporating the first region, the second region, and the third region into a polymer preform. The optical fiber may then be drawn or extruded from the preform such that the first region, the second region, and the third region are simultaneously formed in the optical fiber. For instance, a polymer preform may be constructed that includes a multimode core, a scattering inner cladding, and a clear outer cladding with a pore that is pre-filled and packed with an optomechanical material. This preform may be heated and pulled to create an optomechanical fiber that contains the optomechanical material without a need for post-pulling processing and infilling.

In any of the embodiment described herein, the fibers may be jacketed and/or mirrored to better contain the scattered light and increase the efficiency of the system. Similarly, in all cases, the fiber may be designed to scatter light at a linear or non-linear rate as appropriate for the total length of the actuator and the desired mechanical actuation behavior of the actuator.

The techniques described herein provide the following advantages. Example embodiments integrate the optical delivery network and the mechanical actuator in a compact and lightweight platform, suitable for integration into different surfaces and assemblies. The optomechanical fiber actuators described herein are compatible with a number of different optomechanical materials, actuator designs, and wavelengths of light. The actuators are configured to make efficient use of optical power by precisely delivering it to the optomechanical material and, by jacketing or mirroring the outside of the fiber, preventing light leakage and loss. In addition, the techniques described herein leverage the substantial maturity of optical fiber technology for ready integration with light sources and optical distribution components.

In addition, optomechanical actuation systems have the benefits of being robust, lightweight, and corrosion resistant compared to copper cables and motors. In addition, there are many applications for the optomechanical actuators described herein.

CONCLUSION

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. An actuator, comprising:
   a first region configured to guide light from an optical source;
   a second region configured to scatter the guided light from the first region to a third region, the second region being proximate to the first region; and
   the third region comprising a first material configured to absorb the scattered light to create a mechanical response.

2. The actuator of claim 1, wherein the first material comprises at least one of an optomechanical material, an inorganic material, or a phase change material.

3. The actuator of claim 1, wherein the actuator comprises an optical fiber.

4. The actuator of claim 3, wherein the first region, the second region and the third region are incorporated within the optical fiber.

5. The actuator of claim 3, where in the first region and the second region are incorporated within the optical fiber; and
   wherein the third region is incorporated into an optomechanical fiber that is in intimate contact with the optical fiber.

6. The actuator of claim 3, wherein the first region comprises a core; and
   wherein the second region comprises a scattering cladding that is fully formed around the core.

7. The actuator of claim 3, wherein the first region comprises a core; and
   wherein the second region comprises a scattering cladding that is partially formed around the core.

8. The actuator of claim 3, wherein the optical fiber comprises at least one of silica, a silicate glass, polymer, or non-oxide glass.

9. The actuator of claim 3, wherein the optical fiber comprises a plurality of longitudinal sections, wherein each section is configured to be different to allow for longitudinal variation in fiber properties.

10. The actuator of claim 1, further comprises a fourth region that comprises a second material that is different from the first material, the second material comprising at least one of an optomechanical material, an inorganic material, or a phase change material.

11. The actuator of claim 1, further comprises a fourth region that comprises a second material that is the same as the first material.

12. A system, comprising:
    a plurality of optical fibers, wherein each optical fiber comprises
        a first region configured to guide light from an optical source;
        a second region configured to scatter the guided light from the first region to a third region, the second region being proximate to the first region; and
        the third region that comprises a first material configured to absorb the scattered light to create a mechanical response.

13. The system of claim 12, further comprising:
    a flexible substrate configured to incorporate the plurality of optical fibers.

14. The system of claim 12, wherein the plurality of optical fibers is configured to be uniformly illuminated.

15. The system of claim 12, wherein each of the plurality of optical fibers is configured to be independently illuminated.

16. A method for fabricating an actuator, the method comprising:
    forming a first region that is configured to guide light from an optical source;
    forming a second region that is configured to scatter the guided light from the first region to a third region, the second region being proximate to the first region; and
    forming the third region that comprises a first material configured to absorb the scattered light to create a mechanical response.

17. The method of claim 16, wherein the actuator comprises an optical fiber.

18. The method of claim 17, wherein the forming the third region comprises infilling the first material into a pore formed in the optical fiber.

19. The method of claim 17, wherein the forming the third region comprises
    incorporating the first material into another fiber; and
    coupling the another fiber to the optical fiber such that they are in intimate contact.

20. The method of claim 17, further comprising:
    fabricating the optical fiber by
        incorporating the first region, the second region, and the third region into a polymer preform; and
        drawing or extruding the optical fiber from the preform such that the first region, the second region, and the third region are simultaneously formed in the optical fiber.

* * * * *